US010251199B2

(12) United States Patent
Kim et al.

(10) Patent No.: US 10,251,199 B2
(45) Date of Patent: Apr. 2, 2019

(54) METHOD FOR TRANSMITTING FRAME IN WIRELESS LOCAL AREA NETWORK AND WIRELESS DEVICE USING THE SAME

(71) Applicant: LG ELECTRONICS INC., Seoul (KR)

(72) Inventors: Suhwook Kim, Seoul (KR); Kiseon Ryu, Seoul (KR); Jeongki Kim, Seoul (KR); Hangyu Cho, Seoul (KR); Hyunhee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 47 days.

(21) Appl. No.: 15/470,667

(22) Filed: Mar. 27, 2017

(65) Prior Publication Data
US 2017/0290060 A1 Oct. 5, 2017

Related U.S. Application Data

(60) Provisional application No. 62/314,941, filed on Mar. 29, 2016.

(51) Int. Cl.
*H04W 74/08* (2009.01)
*H04W 72/04* (2009.01)
(Continued)

(52) U.S. Cl.
CPC ... *H04W 74/0816* (2013.01); *H04W 72/0453* (2013.01); *H04W 74/006* (2013.01); *H04W 84/12* (2013.01)

(58) Field of Classification Search
CPC ............. H04W 84/12; H04W 74/0816; H04W 74/006; H04W 72/121; H04W 72/042;
(Continued)

(56) References Cited

U.S. PATENT DOCUMENTS

2016/0164654 A1* 6/2016 Huang ................. H04B 7/0452
370/392
2016/0315738 A1* 10/2016 Huang .............. H04W 72/0453
(Continued)

OTHER PUBLICATIONS

IEEE P802.11-REVmc™ ID2.0, Oct. 2013, Draft Standard for Information technology,Telecommunications and information exchange between systems, Local and metropolitan area networks, Specific requirements, Part 11: Wireless LAN Medium Access Control (MAC) and Physical Layer (PHY) Specifications, Section 8.3.1.2.
(Continued)

*Primary Examiner* — Jung H Park
(74) *Attorney, Agent, or Firm* — Lee, Hong, Degerman, Kang & Waimey

(57) ABSTRACT

According to an embodiment of the present specification, a method of transmitting a frame in a wireless local area network (WLAN) includes: receiving, by a user station (STA), a multi user-request to send (MU-RTS) frame from an access point (AP) to protect transmission for multi-users, wherein the MU-RTS frame includes common information commonly allocated to the multi-users, user-specific information individually allocated to the multi-users, and a control indicator indicating a first operation mode using a first channel and a second channel contiguous to the first channel and a second operation mode using the first channel and a third channel non-contiguous to the first channel; and transmitting, by the user STA, a clear to send (CTS) frame to the AP according to the control indicator in response to the MU-RTS frame.

8 Claims, 18 Drawing Sheets

(51) Int. Cl.
*H04W 84/12* (2009.01)
*H04W 74/00* (2009.01)

(58) Field of Classification Search
CPC .......................... H04W 88/08; H04W 72/0413;
H04L 5/0007; H04L 5/0094
See application file for complete search history.

(56) References Cited

U.S. PATENT DOCUMENTS

2016/0316468 A1* 10/2016 Huang .............. H04W 72/0446
2017/0170939 A1* 6/2017 Huang ................. H04L 5/0007
2018/0131471 A1* 5/2018 Ahn ...................... H04L 1/1664

OTHER PUBLICATIONS

IEEE P802.11-REVmc™ ID2.0, Oct. 2013, Draft Standard for Information technology,Telecommunications and information exchange between systems, Local and metropolitan area networks, Specific requirements, Part 11: Wireless LAN Medium Access Control (MAC) and Physical Layer (PHY) Specifications, Section 8.3.1.3.

* cited by examiner (A)

(B)

METHOD FOR TRANSMITTING FRAME IN WIRELESS LOCAL AREA NETWORK AND WIRELESS DEVICE USING THE SAME

CROSS-REFERENCE TO RELATED APPLICATIONS

Pursuant to 35 U.S.C. § 119(e), this application claims the benefit of U.S. Provisional Patent Application No. 62/314,941, filed on Mar. 29, 2016, the contents of which are hereby incorporated by reference herein in its entirety.

TECHNICAL FIELD

The present invention relates to wireless communication, and more particularly, to a method for transmitting a frame in a wireless local area network (WLAN) system, and a wireless device using the same.

BACKGROUND

Various channel bandwidths from 20 MHz to 160 MHz can be used in a wireless local area network (hereinafter, WLAN) system. Accordingly, determining of an appropriate channel bandwidth for communication between a transmitting terminal and a receiving terminal has become an important factor in determining of performance of the WLAN system.

A dynamic channel bandwidth setting protocol based on a request to send (RTS) frame and a clear to send (CTS) frame has been developed since IEEE 802.11ac to determine the appropriate channel bandwidth for communication between the transmitting terminal and the receiving terminal.

The RTS and CTS frames were initially designed to resolve a hidden node issue and to reduce a data frame collision overhead. The transmitting terminal transmits the RTS frame to the receiving terminal before transmitting a data frame. A destination terminal which has received the RTS frame transmits the CTS frame to the transmitting terminal in response thereto. Third terminals which have received the RTS and CTS frames may delay a media access for a specific time to protect the data frame to be transmitted at a later time.

In the dynamic channel bandwidth setting protocol which has been supported since IEEE 802.11ac, the transmitting terminal may transmit the RTS frame in a wide band exceeding a 20 MHz channel bandwidth, and the destination terminal may transmit the CTS frame in response thereto in accordance with a channel bandwidth that can be currently used by the destination terminal.

SUMMARY OF THE INVENTION

The present specification relates to a method of transmitting a frame in a wireless local area network (WLAN). According to an embodiment of the present specification, a method of transmitting a frame in a WLAN includes: receiving, by a user station (STA), a multi user-request to send (MU-RTS) frame from an access point (AP) to protect transmission for multi-users, wherein the MU-RTS frame includes common information commonly allocated to the multi-users, user-specific information individually allocated to the multi-users, and a control indicator indicating a first operation mode using a first channel and a second channel contiguous to the first channel and a second operation mode using the first channel and a third channel non-contiguous to the first channel; and transmitting, by the user STA, a clear to send (CTS) frame to the AP according to the control indicator in response to the MU-RTS frame.

DETAILED DESCRIPTION

The aforementioned features and following detailed descriptions are provided for exemplary purposes to facilitate explanation and understanding of the present specification. That is, the present specification are not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
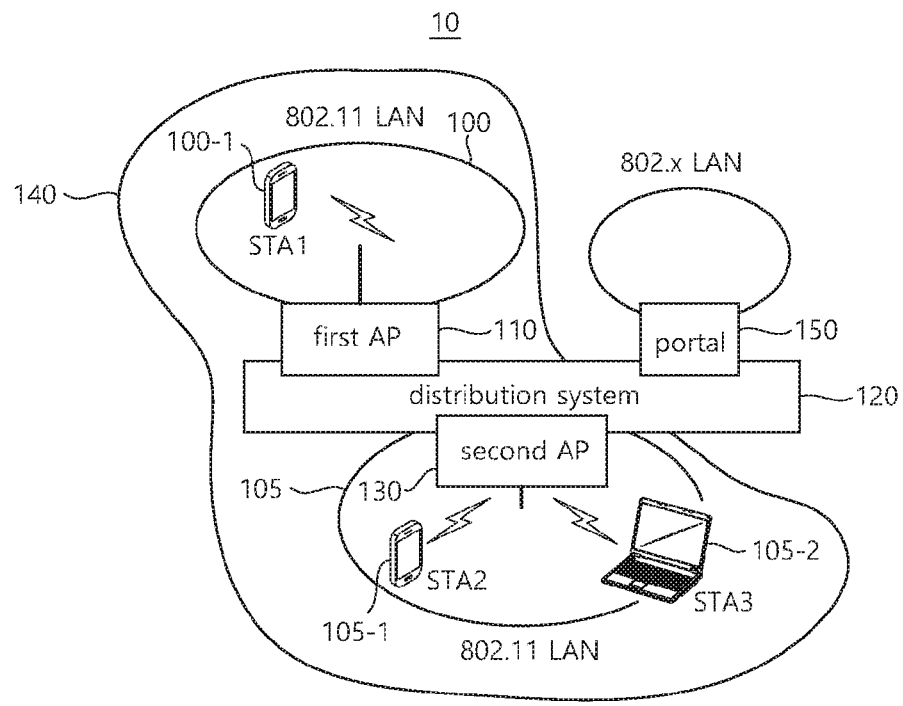
FIG. 1 is a conceptual view illustrating the structure of a wireless local area network.
Figure 1:
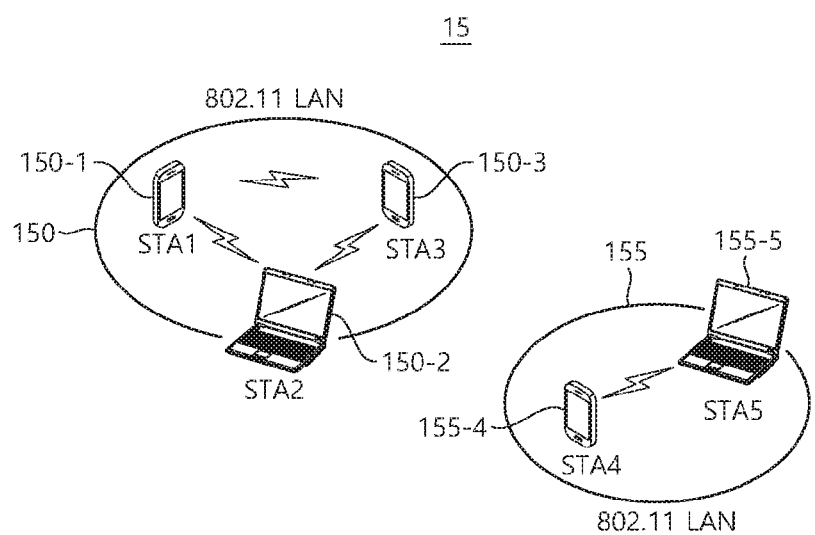

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system (10) of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
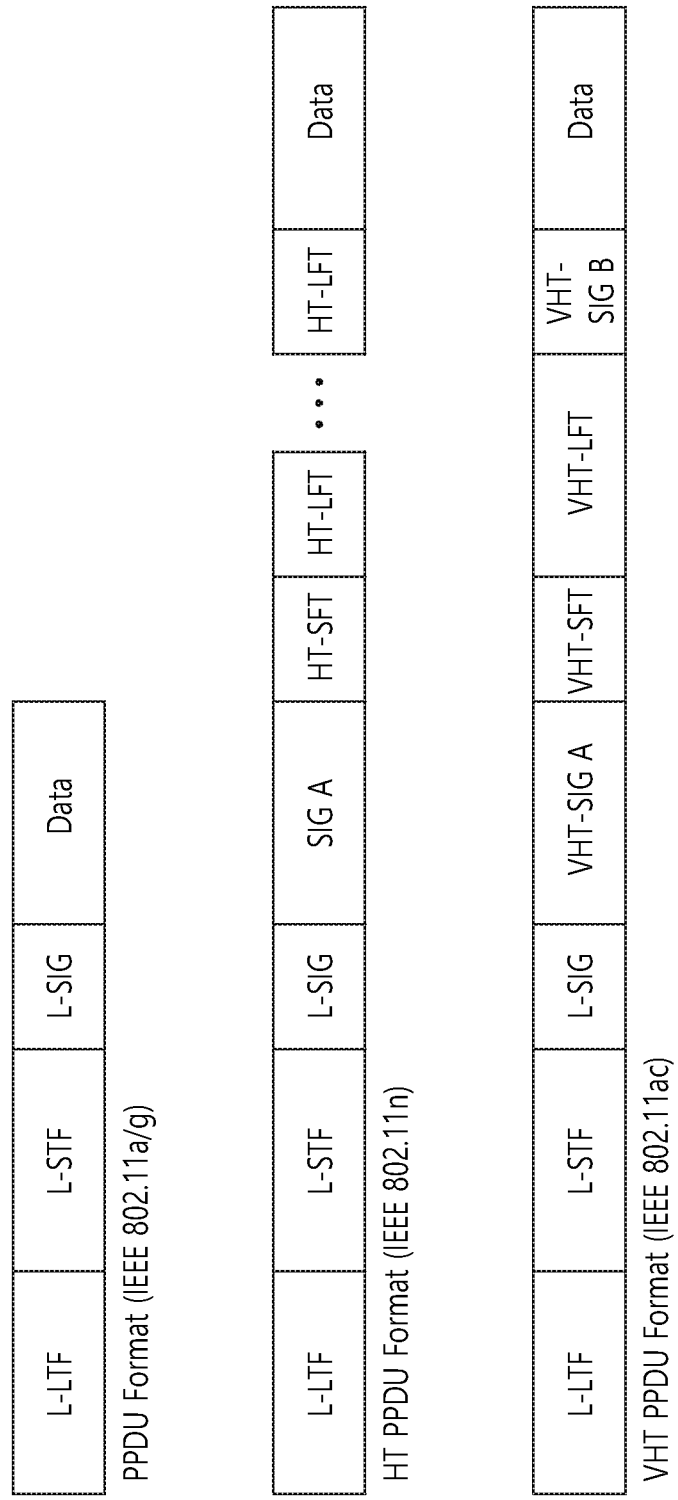
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
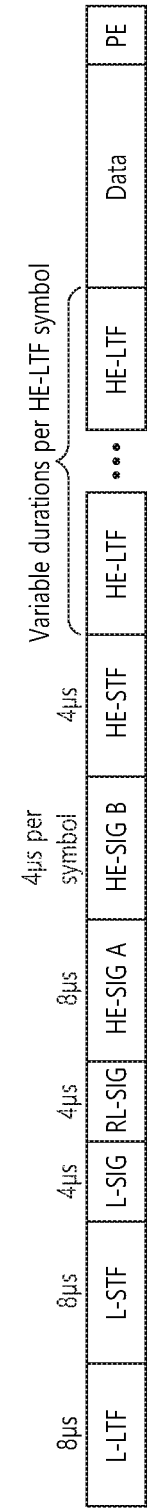
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
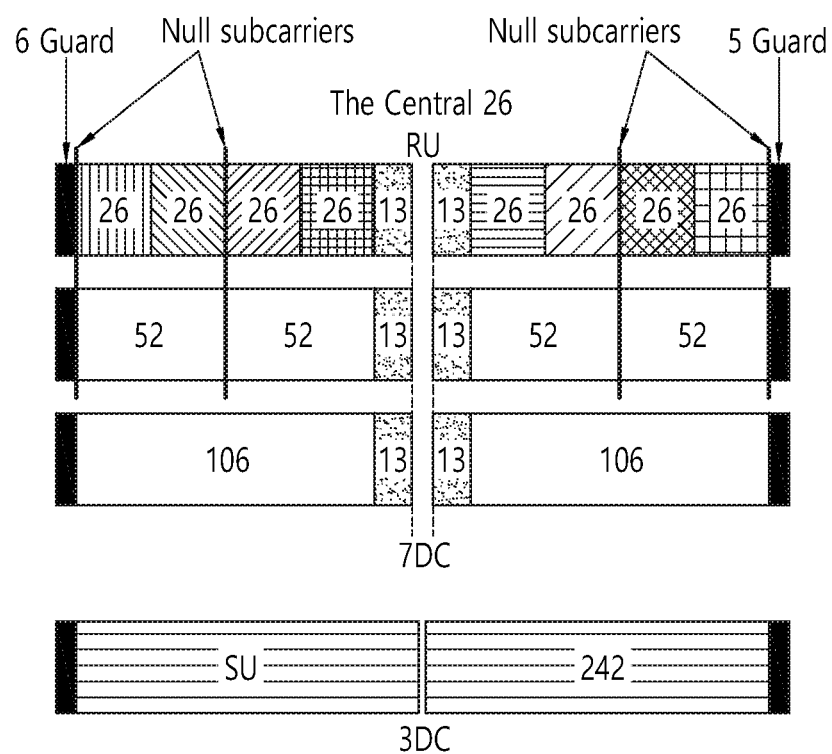
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
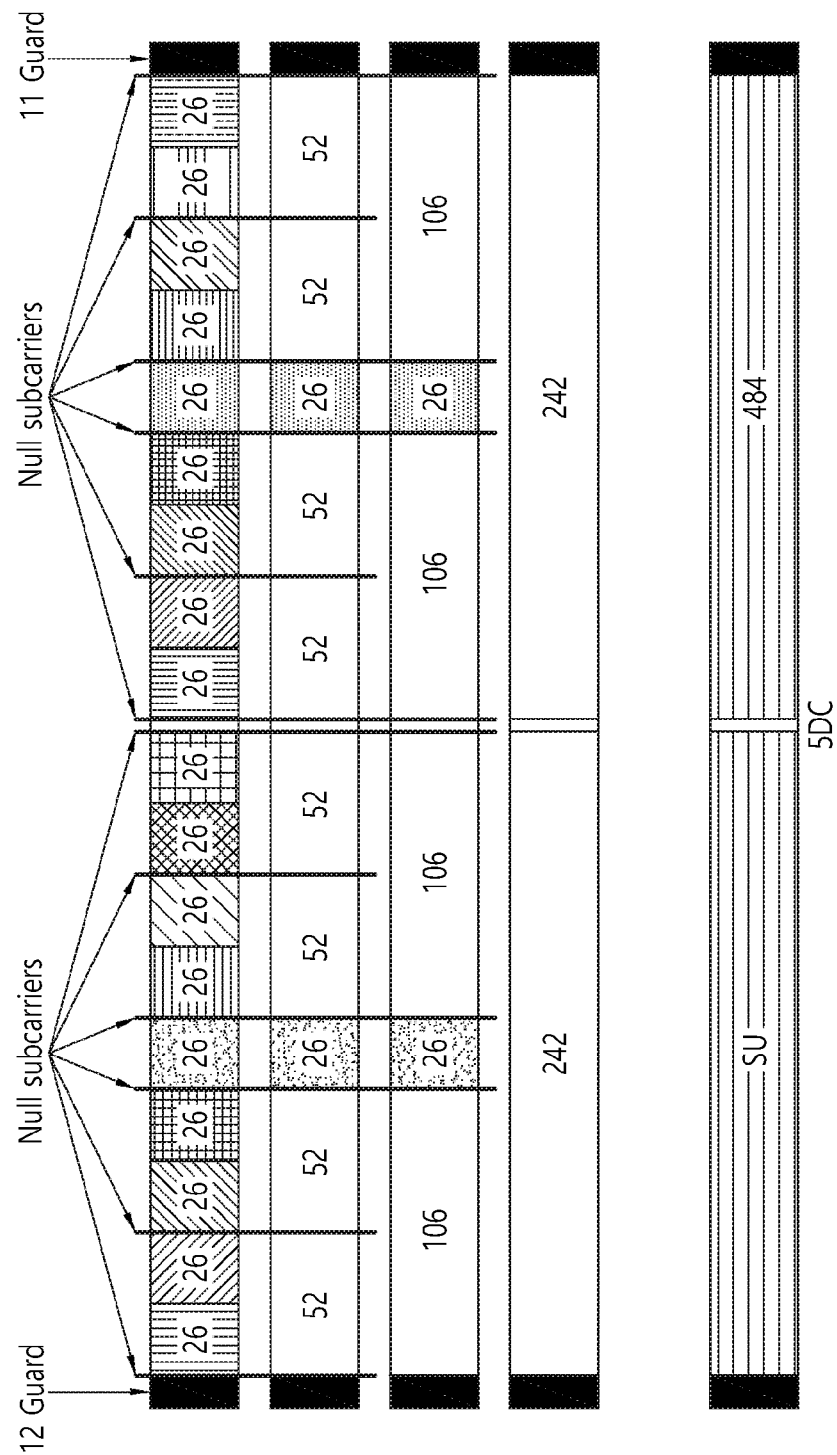
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
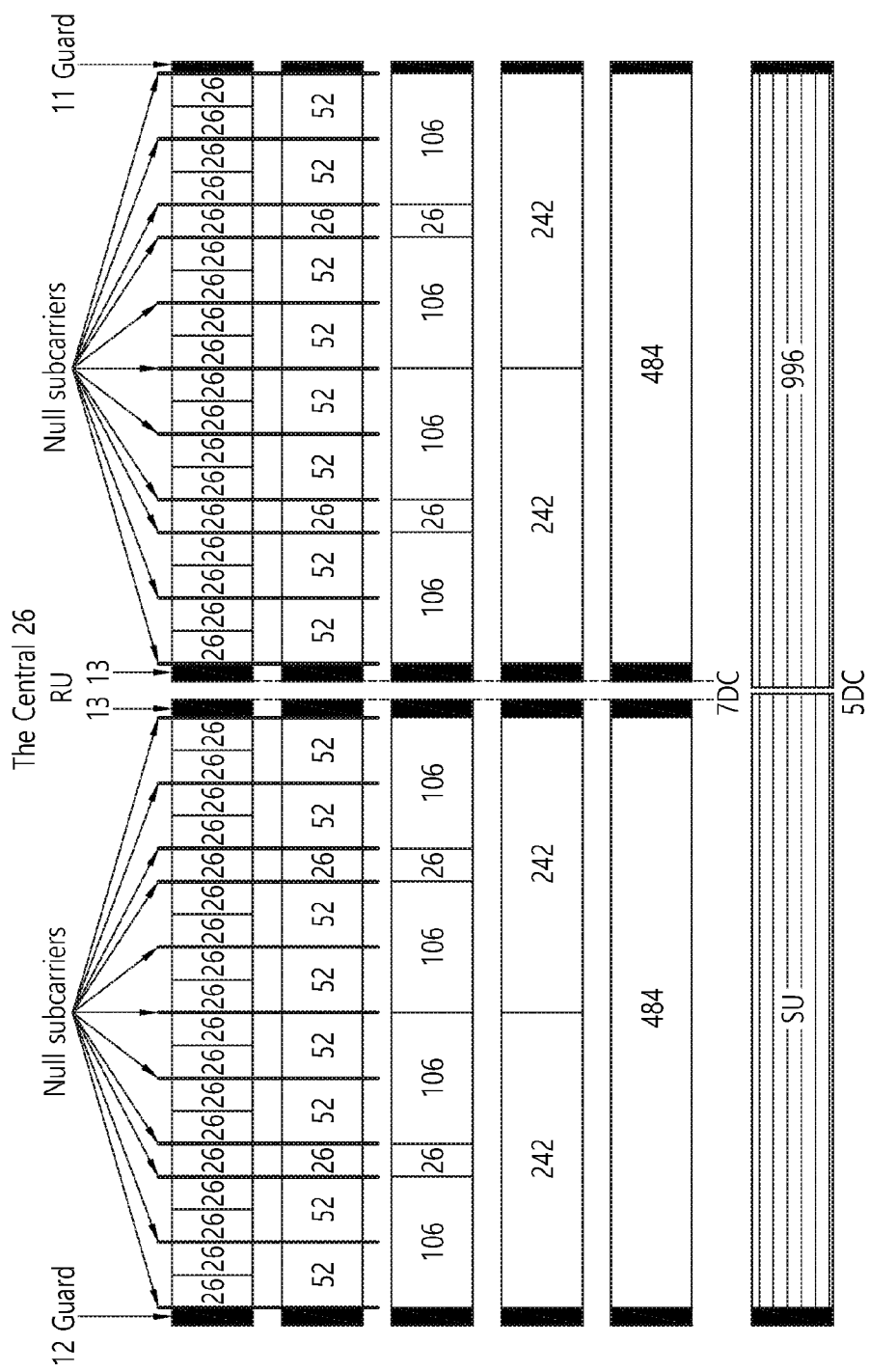
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
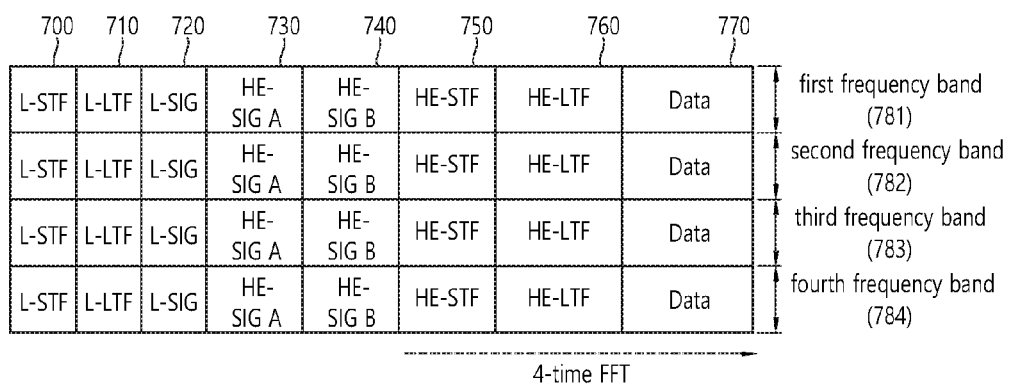
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame).

Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
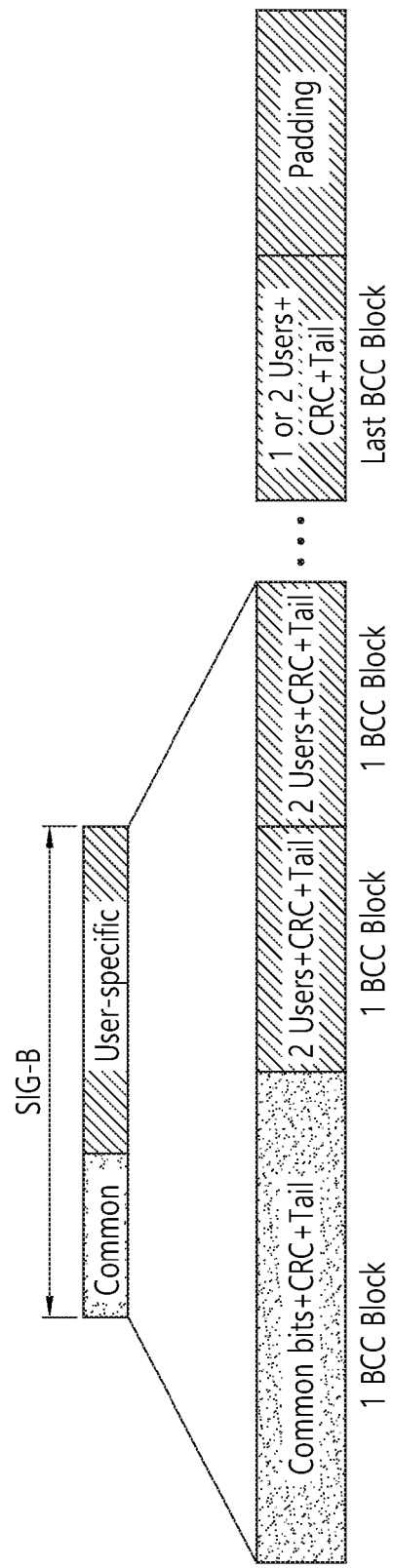
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
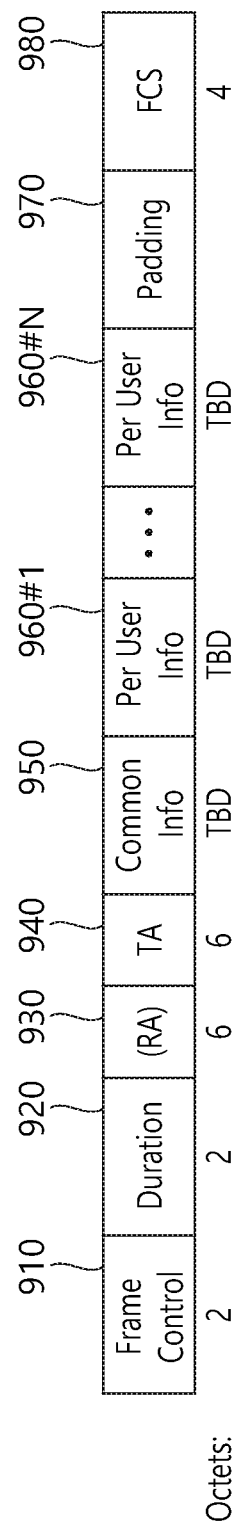
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
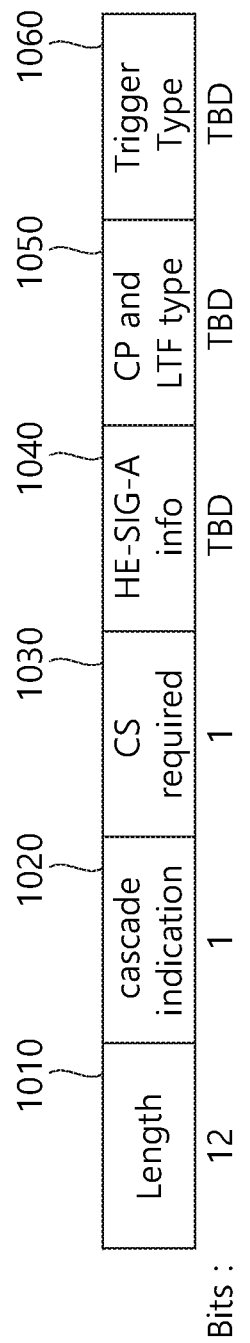
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
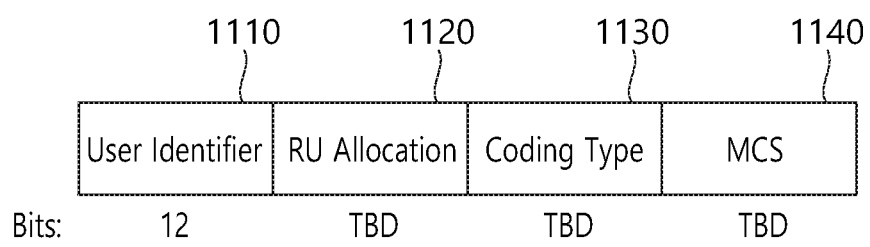
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding may is applied to the uplink PPDU, the coding type field 1130 may be set to '1', and when the LDPC coding is applied, the coding type field 1130 may be set to '0'.

Figure 12:
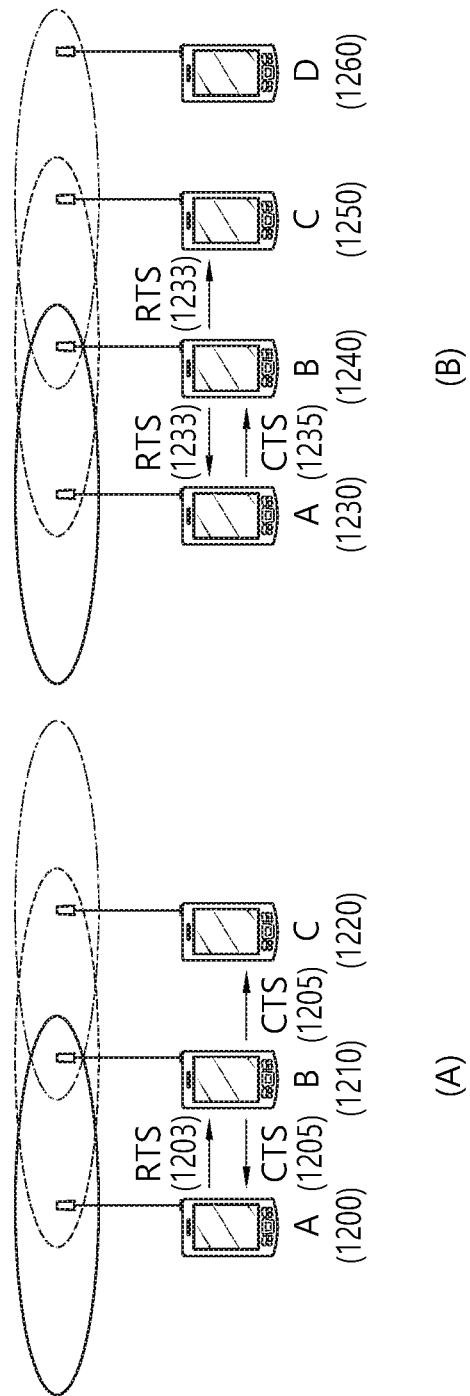
FIG. 12 is a conceptual view illustrating a method of using a request to send (RTS) frame and a clear to send (CTS) frame to resolve a hidden node issue and an exposed node issue.

FIG. 12 is a conceptual view illustrating a method of using an RTS frame and a CTS frame to resolve a hidden node issue and an exposed node issue.

Referring to FIG. 12, a short signaling frame such as a request to send (RTS) frame and a clear to send (CTS) frame may be used to resolve a hidden node issue and an exposed node issue. Neighboring STAs may know whether data is transmitted or received between two STAs on the basis of the RTS frame and the CTS frame.

FIG. 12(A) illustrates a method of transmitting an RTS frame 1203 and a CTS frame 1205 to resolve a hidden node issue.

It is assumed that both an STA A 1200 and an STA C 1220 intent to transmit data frames to an STA B 1210. For example, the STA A 1200 may transmit the RTS frame 1203 to the STA B 1210 before transmission of the data frame, and the STA B 1210 may transmit the CTS frame 1205 to the STA A 1200.

The STA C 1220 may overhear the CTS frame 1205 and know frame transmission from the STA A 1200 to the STA B 1210 through a medium. The STA C 1220 may configure a network allocation vector (NAV) until data frame transmission from the STA A 1200 to the STA B 1210 is terminated. By using this method, an inter-frame collision caused by a hidden node can be prevented.

FIG. 12(B) illustrates a method of transmitting an RTS frame 1233 and a CTS frame 1235 to resolve an exposed node issue.

For example, an STA C 1250 may determine whether a collision occurs when a frame is transmitted to another STA D 1260 on the basis of monitoring of the RTS frame 1233 and the CRS frame 1235 of an STA A 1230 and an STAB 1240.

In addition, the STA B 1240 may also transmit the RTS frame 1233 to the STA A 1230, and the STA A 1230 may transmit the CTS frame 1235 to the STA B 1240. The STA C 1250 may overhear only the RTS frame 1233 transmitted by the STA B 1240. On the contrary, the CTS frame 1235 transmitted by the STA A 1230 cannot be overheard.

Eventually, the STA C 1250 may determine that the STA A 1230 is located outside a carrier sensing range of the STA C 1250. Accordingly, the STA C 1250 may transmit data to the STA D 1260.

An RTS frame format and a CTS frame format are disclosed in the 8.3.1.2 RTS frame format and 8.3.1.3 CTS frame format of IEEE P802.11-REVmcTM/D2.0, October 2013.

Figure 13:
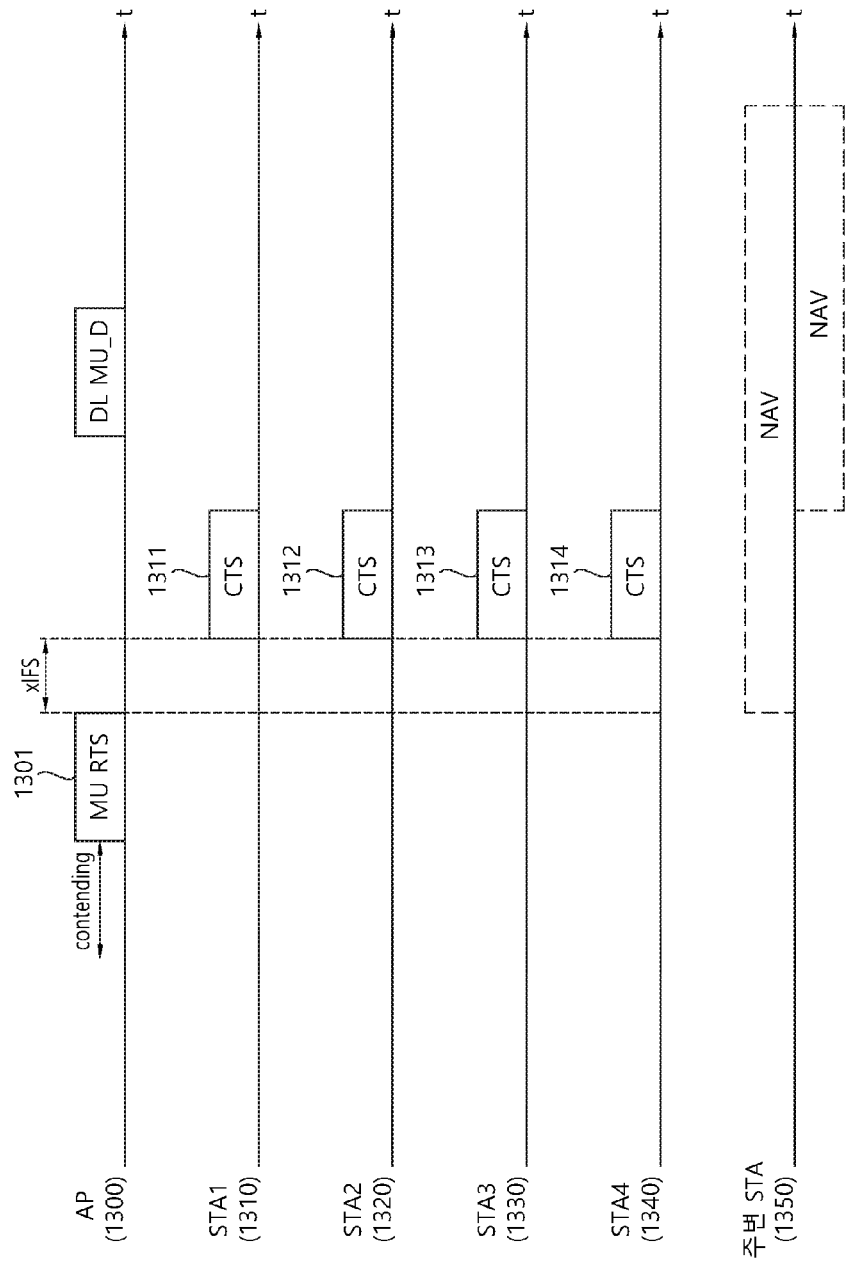
FIG. 13 illustrates a media protection method for orthogonal frequency division multiple access (OFDMA)-based communication in a wireless local area network (WLAN) system according to the present embodiment.

FIG. 13 illustrates a media protection method for OFDMA-based communication in a WLAN system according to the present embodiment. In FIG. 13, a horizontal axis represents a time t, and a vertical axis represents a presence or absence of a frame in terms of a frequency bandwidth.

Referring to FIG. 13, an AP 1300 may protect transmission for a multi user (MU) based on the an MU RTS frame 1301 and CTS frames 1311 to 1314.

The AP 1300 of FIG. 13 may transmit the MU RTS frame 1301 by using an 80 MHz channel bandwidth including a predetermined primary 20 MHz channel. Details thereof will be explained with reference to FIG. 14 to be described below.

The MU RTS frame mentioned in an embodiment of the present specification may be a variant frame of the trigger frame of FIG. 9. The MU RTS frame may be a frame for receiving the CTS frame from multiple users (MUs) in an overlapping time resource.

More specifically, each field of the trigger frame of FIG. 9 for the MU RTS frame may be configured as follows. The MU RTS frame as the variant frame of the trigger frame may include information (e.g., 1060 of FIG. 10) on a type of the trigger frame included in the common information field 950. For example, the information (e.g., 1060 of FIG. 10) on the type of the trigger frame may be set to indicate an RTS frame (i.e., MU RTS frame) for the multiple users (MUs).

In addition, an RA field (930 in FIG. 9) included in the MU RTS frame may be set to a broadcast address. A CP and LTF type field 1050 and a length field 1010 included in the common information field 950 of the trigger frame for the MU RTS frame may be set to reserved fields.

The MU RTS frame according to the present embodiment may include a control indicator which informs a user STA of an operation mode for transmission of the CTS frame in response to the MU RTS frame. That is, the user STA according to the present embodiment may transmit the CTS frame on the basis of the operation mode indicated by the control indicator included in the MU RTS frame.

When a first operation mode is indicated, each user STA which has received the MU RTS frame according to the present embodiment may use only a predetermined first channel and a second channel contiguous to the first channel.

For example, the first channel is referred to as a first sub-channel, and may be a primary 20 MHz channel.

The second channel may be a second sub-channel corresponding to a secondary 20 MHz band. Alternatively, the second channel may be a channel including the second sub-channel and a plurality of third sub-channels corresponding to a secondary 40 MHz band. Alternatively, the second channel may be a channel including the second sub-channel, the plurality of third sub-channels, and a plurality of fourth sub-channels corresponding to a secondary 80 MHz band.

In addition, when the first operation mode is indicated, the RU allocation field 1120 of FIG. 11 may be set to indicate any one of a primary 20 MHz channel, a primary 40 MHz channel, a primary 80 MHz channel, and a 160 MHz/80+80 MHz channel for a CTS frame to be transmitted by a user STA.

In addition, when the first operation mode is indicated, each user STA may confirm a channel state of a sub-channel of a 20 MHz band unit corresponding to a primary channel indicated by the RU allocation field 1120 of FIG. 11 for a predetermined time xIFS.

When the second operation mode is indicated, each user STA which has received the MU RTS frame according to the present embodiment may use a predetermined first channel and a third channel non-contiguous to the first channel.

For example, the first channel is referred to as a first sub-channel, and may be a primary 20 MHz channel. The third channel may be a channel including at least one sub-channel among a plurality of third sub-channels corresponding to a secondary 40 MHz band. Alternatively, the third channel may be a channel including at least one sub-channel among a plurality of fourth sub-channels corresponding to a secondary 80 MHz band.

In addition, when the second operation mode is indicated, the RU allocation field 1120 of FIG. 11 may be set to indicate any one of a secondary 20 MHz channel, a secondary 40 MHz channel, a secondary 80 MHz channel, and a 160 MHz/80+80 MHz channel for the CTS frame to be transmitted by the user STA. However, when a control indicator indicates the second operation mode, each user STA may use a channel of the secondary 20 MHz band contiguous to the primary 20 MHz channel.

When the second operation mode is indicated, each user STA may confirm a channel state of a sub-channel of a 20 MHz band unit corresponding to a secondary channel indicated by the RU allocation field 1120 of FIG. 11 for the predetermined time xIFS. In addition, each user STA may confirm a channel state of the primary 20 MHz channel not indicated by the RU allocation field 1120.

That is, when the second operation mode is indicated, if the primary 20 MHz channel and a sub-channel of a 20 MHz band unit corresponding to the secondary channel are both idle for the predetermined time xIFS, each user STA may transmit a CTS frame to be described below.

For example, the predetermined time xIFS may be short inter-frame space (SIFS). In addition, the user STA may determine whether a channel state of a sub-channel of the 20 MHz band unit is an idle state or a busy state by considering a state of an indicator internally generated according to a signal delivered from a physical layer of the user STA for the predetermined time xIFS.

When the first operation mode is indicated, if all sub-channels of the 20 MHz band unit indicated by the RU allocation field 1120 in FIG. 11 are idle, the user STA may configure the CTS frame in response to the MU RTS frame.

When the second operation mode is indicated, if any one of the sub-channels of the 20 MHz band unit indicated by the RU allocation field 1120 of FIG. 11 is busy, the user STA may not configure the CTS frame in response to the MU RTS frame.

The CTS frames 1311, 1312, 1313, and 1314 according to the present embodiment may be configured as fields including the same data. The CTS frames 1311, 1312, 1313, and 1314 may be transmitted using a single network frequency.

For brief explanation of FIG. 13, it is described that respective user STAs 1310, 1320, 1330, and 1340 determine all sub-channels of a 20 MHz band unit allocated by the RU allocation field 1120 of FIG. 11 (when the second operation mode is indicated, the primary 20 MHz channel is also included) as an idle state for the predetermined time xIFS.

Accordingly, the respective user STAs 1310, 1320, 1330, and 1340 may transmit the CTS frames 1311, 1312, 1313, and 1314 by using the sub-channel of the 20 MHz band unit allocated by the RU allocation field 1120 of FIG. 11 (for example, when the second operation mode is indicated, the primary 20 MHz channel is also included).

A neighboring STA 1350 may configure an NAV according to a value which is set in a duration field (920 of FIG. 9) included in the MU RTS frame. The neighboring STA 1350 may configure the NAV according to a value which is set in a duration field (not shown) included in a CTS frame. The neighboring STA 1350 is restricted from accessing a medium for a time corresponding to the set value for the NAV.

The AP 1300 which has received the CTS frames 1311, 1312, 1313, and 1314 may transmit a data frame DL MUD on the basis of a downlink multi user orthogonal frequency-division multiple access (DL MU OFDMA) for the plurality of user STAs 1310, 1320, 1330, and 1340.

Figure 14:
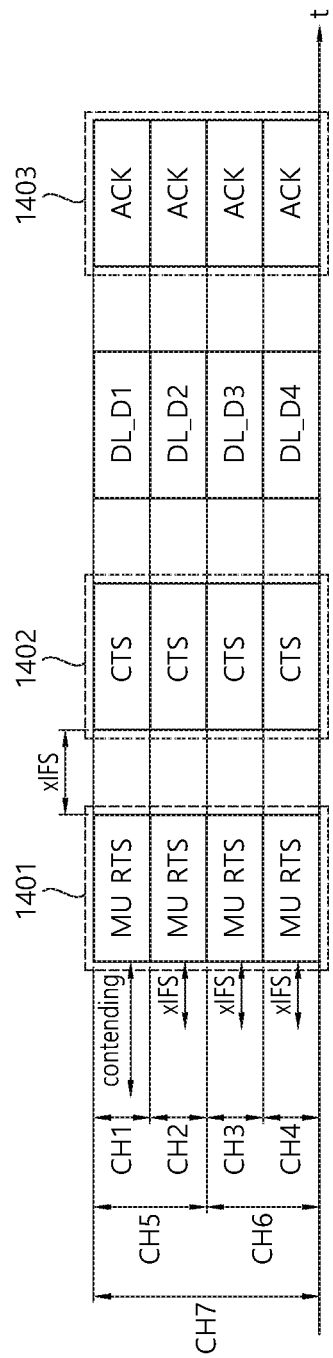
FIG. 14 is an exemplary diagram illustrating a channel for OFDMA-based communication in a WLAN system according to the present embodiment.

FIG. 14 is an exemplary diagram illustrating a channel for OFDMA-based communication in a WLAN system according to the present embodiment. For brevity and clarity, FIG. 14 focuses on four sub-channels CH1 to CH4 having a 20 MHz bandwidth included in an 80 MHz channel band.

Referring to FIG. 13 and FIG. 14, any one of the first to fourth sub-channels CH1 to CH4 may be predetermined as a primary 20 MHz channel for a transmit opportunity (TXOP) initial access.

In case of FIG. 14, it is assumed that the first sub-channel CH1 is the primary 20 MHz channel. In this case, each of the second to fourth sub-channels CH2 to CH4 may be referred to as a non-primary 20 MHz channel or a secondary 20 MHz channel.

In addition, a fifth sub-channel CH5 corresponding to a frequency band of the first sub-channel CH1 and the second sub-channel CH2 may be referred to as a primary 40 MHz channel. A sixth sub-channel CH6 corresponding to a frequency band of the third sub-channel CH3 and the fourth sub-channel CH4 may be referred to as a secondary 40 MHz channel. A seventh sub-channel CH7 corresponding to a frequency band of the fifth sub-channel CH5 and the sixth sub-channel CH 6 may be referred to as a primary 80 MHz channel.

In the present specification, a channel contiguous to the first sub-channel CH1 which is the primary 20 MHz channel may be referred to as the second sub-channel CH2, the fifth sub-channel CH5, and the seventh sub-channel CH7. In addition, a channel non-contiguous to the first sub-channel CH1 which is the primary 20 MHz channel may be referred to as the third sub-channel CH3, the fourth sub-channel CH4, and the sixth sub-channel CH6.

In order to transmit the MU RTS frame of FIG. 14, the AP 1300 may perform a back-off procedure for a channel access to the predetermined primary channel CH1. In addition, the AP 1300 may confirm a channel state of the non-primary channels CH2, CH3, and CH4 for a specific time xIFS before a back-off timer expires. In this case, the specific time xIFS may be PIFS.

When the channel access to the primary channel CH1 is obtained and the channel states of the second to fourth sub-channels CH2 to CH4 are idle, a PHY protocol data unit (PPDU) including the MU RTS frame of FIG. 14 (hereinafter, 'RTS PPDU') may be transmitted through the first to fourth sub-channels CH1 to CH4.

An RTS PPDU transmitted through the second to fourth sub-channels CH2 to CH4, which are the secondary 20 MHz channels, may have a duplicate PPDU format. The RTS PPDU of the duplicate PPDU format may include a duplicated field. That is, the RTS PPDU having the duplicated PPDU format and duplicated from a field of the RTS PPDU transmitted on the primary channel CH1 may be transmitted on the non-primary channels (i.e., CH2 to CH4).

In terms of a frame unit, the RTS PPDU transmitted on the first sub-channel CH1 and the second RTS PPDU transmitted on the second to fourth sub-channels CH2 to CH4 may be represented by one RTS PPDU 1401.

The CTS frame 1402 may be received by the AP 1300 through the first to fourth sub-channels CH1 to CH4 with the duplicate PPDU format. FIG. 14 assumes a case where the CTS frame of the duplicated PPDU format is received through the first to fourth sub-channels CH1 to CH4.

The AP 1300 may transmit a plurality of pieces of downlink data (or downlink frame, downlink PPDU) DL_D1 to DL_D4 through a sub-band (or frequency resource) allocated to each of the plurality of STAs for DL MU OFDMA transmission. That is, the AP 1300 may individually transmit the downlink data DL_D1 to DL_D4 to the plurality of STAs by using the PPDU format for DL MU OFDMA transmission.

For example, the AP 1300 may transmit the first downlink data DL_D1 to the first STA 1310 through the first sub-channel CH1 by using the PPDU format for DL MU OFDMA. The AP 1300 may transmit the second downlink data DL_D2 to the second STA 1320 through the second sub-channel CH2 by using the PPDU format for the DL MU OFDMA.

The AP 1300 may transmit the third downlink data DL_D3 to the third STA 1330 through the third sub-channel CH3 by using the PPDU format for the DL MU OFDMA. The AP 1300 may transmit the fourth downlink data DL_D4 to the fourth STA 1340 through the fourth sub-channel CH4 by using the PPDU format for DL MU OFDMA.

That is, the first downlink data DL_D1, the second downlink data DL_D2, the third downlink data DL_D3, and the fourth downlink data DL_D4 may be transmitted to the respective user STAs by using overlapping time resources.

More specifically, the plurality of user STAs may obtain information on an allocated channel (or sub-band) through a header of a downlink PPDU. A previous field of a specific field (e.g., HE-SIG B) on the PPDU format for DL MU OFDMA may be transmitted in a duplicated form in each of different transmission resources.

In addition, the specific field (e.g., HE-SIG B) on the PPDU format for DL MU OFDMA may be transmitted in an encoded form on the entire transmission resource, and a field subsequent to the specific field (e.g., HE-SIG B) may include individual information for each of the plurality of STAs.

Each of the plurality of user STAs may receive a downlink PPDU by monitoring a plurality of channels until the specific field. Each of the plurality of user STAs may receive downlink data for each of the plurality of STAs by decoding data transmitted through a channel allocated to each of the plurality of user STAs after the specific field.

The AP 1300 may receive an ACK frame 1403 transmitted from each user STA to inform the AP of successful reception of downlink data.

In the aforementioned case, it is assumed that each of the first to fourth sub-channels CH1 to CH4 is a channel of a 20 MHz unit. However, downlink frame transmission based on DL MU OFDMA may also be defined in a sub-band granularity (e.g., 5 MHz) less than 20 MHz.

In this case, the first to fourth sub-channels CH1 to CH4 may be defined as a channel band (for example, 5 MHz) less than 20 MHz. An RTS frame and a CTS frame may be transmitted based on a non-duplicate PPDU format (or non-duplicate frame format).

Although the sub-channels CH1 to CH4 having four units of the 20 MHz bandwidth corresponding to the 80 MHz channel band are described for brief description of FIG. 13 and FIG. 14, this is for exemplary purposes only, and the present specification is not limited to the above embodiment.

Figure 15:
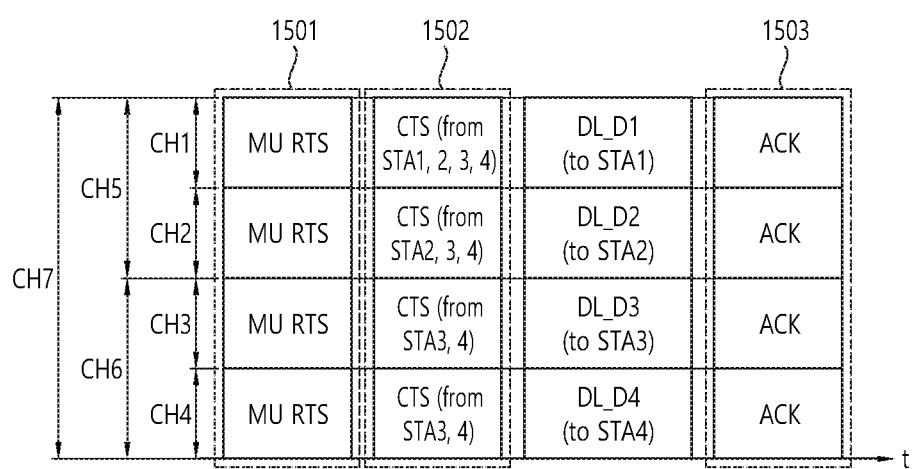
FIG. 15 is a diagram illustrating an operation of a WLAN system based on a first operation mode according to the present embodiment.

FIG. 15 is a diagram illustrating an operation of a WLAN system based on a first operation mode according to the present embodiment. In FIG. 15, a horizontal axis may represent a time t, and a vertical axis may represent a presence or absence of a frame in terms of frequency.

Referring to FIGS. 13 to 15, the description on the plurality of sub-channels CH1 to CH7 of FIG. 15 may be replaced with the description on the plurality of sub-channels CH1 to CH7 of FIG. 14. In addition, the description on the downlink data DL_D1 to DL_D4 and the ACK frame 1503 of FIG. 15 may be replaced with the description on the downlink data DL_D1 to DL_D4 and the ACK frame 1403 of FIG. 14. An MU RTS frame 1501 of FIG. 15 may be understood based on the description on the MU RTS frame 1401 of FIG. 14.

However, the MU RTS frame 1501 of FIG. 15 may include a plurality of individual user information fields (960#1 to 960#N of FIG. 9) for a plurality of user STAs. For example, the MU RTS frame 1501 for the first to fourth user STAs may include first to fourth individual user information fields (960#1 to 960#4 of FIG. 9).

When the first operation mode is indicated by the control indicator included in the MU RTS frame 1501, each of the individual user fields 960#1 to 960#N may include information on an uplink channel allocated for transmission of the CTS frame.

When the first operation mode is indicated, the AP may allocate the uplink channel to include the first channel CH1 which is the primary 20 MHz channel for transmission of the CTS frame of each user STA.

For example, the first channel CH1 may be allocated for the first STA 1310. The fifth channel CH5 may be allocated for the second STA 1320. The seventh channel CH7 may be allocated for the third and fourth STAs 1330 and 1340. A user STA which has received the MU RTS frame may confirm a channel state of a sub-channel of a 20 MHz unit corresponding to a channel indicated by the RTS frame.

If any one of the sub-channels of the 20 MHz unit corresponding to the channel indicated by the RTS frame is busy, the user STA may not transmit the CTS frame. If all sub-channels of the 20 MHz unit corresponding to the channel indicated by the RTS frame are idle, the user STA may transmit the CTS frame.

Figure 16:
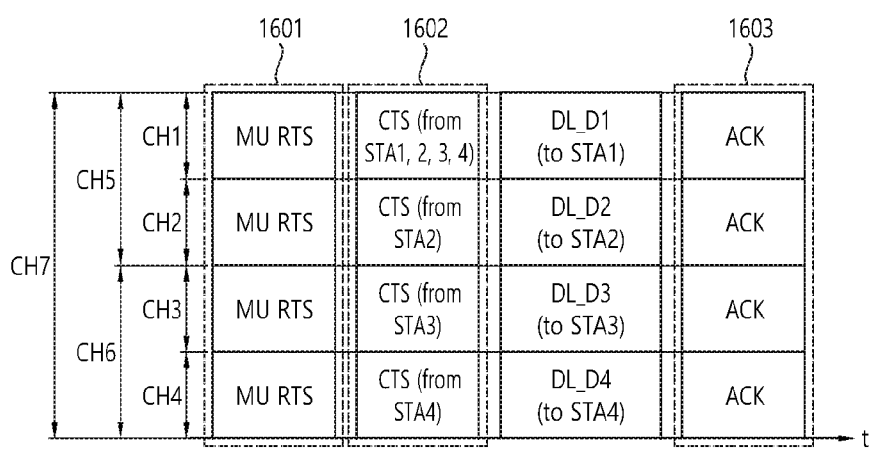
FIG. 16 is a diagram illustrating an operation of a WLAN system based on a second operation mode according to the present embodiment.

FIG. 16 is a diagram illustrating an operation of a WLAN system based on a second operation mode according to the present embodiment. In FIG. 16, a horizontal axis may represent a time t, and a vertical axis may represent a presence or absence of a frame in terms of frequency.

Referring to FIG. 13, FIG. 14, and FIG. 16, the description on the plurality of sub-channels CH1 to CH7 of FIG. 16 may be replaced with the description on the plurality of sub-channels CH1 to CH7 of FIG. 14. In addition, the description on the downlink data DL_D1 to DL_D4 and the ACK frame 1603 of FIG. 16 may be replaced with the description on the downlink data DL_D1 to DL_D4 and the ACK frame 1403 of FIG. 14. An MU RTS frame 1601 of FIG. 16 may be understood based on the description on the MU RTS frame 1401 of FIG. 14.

However, the MU RTS frame 1601 of FIG. 16 may include a plurality of individual user information fields (960#1 to 960#N of FIG. 9) for a plurality of user STAs. For example, the MU RTS frame 1601 for the first to fourth user STAs may include first to fourth individual user information fields (960#1 to 960#4 of FIG. 9).

When the second operation mode is indicated by the control indicator included in the MU RTS frame 1601, each of the individual user fields 960#1 to 960#N may include information on an uplink channel allocated for transmission of the CTS frame.

When the second operation mode is indicated, the AP may allocate a channel non-contiguous to the first channel CH1 which is the primary 20 MHz channel for transmission of the CTS frame of each user STA. For example, the third channel CH3 may be allocated for the third STA 1330. The fourth channel CH4 may be allocated for the fourth STA 1340. In this case, the third channel CH3 and the fourth channel CH4 are channels non-contiguous to the first channel CH1 which is the primary 20 MHz channel.

When the second operation mode is indicated, the first channel CH1 may be allocated for the first STA 1310. The second channel CH2 may be allocated for the second STA 1320. That is, when the second operation mode is indicated, not only a channel that can be allocated in the first operation mode by the AP but also a channel non-contiguous to the primary 20 MHz channel CH1 may be allocated for each user STA.

When the second operation mode is indicated, each user STA may confirm a channel state of the primary 20 MHz channel and the sub-channel of the 20 MHz unit corresponding to the channel indicated by the RTS frame for transmission of the CTS frame.

As described above, each user STA may consider a state of an indicator internally generated according to a signal delivered to a physical layer of the user STA to determine the channel state of the primary 20 MHz channel and the sub-channel of the 20 MHz unit corresponding to the channel indicated by the RTS frame.

In addition, the user STA may transmit the CTS frame by using the primary 20 MHz channel and the sub-channel of the 20 MHz unit corresponding to the channel indicated by the RTS frame.

For example, if any one of the sub-channels of the 20 MHz unit corresponding to the channel indicated by the RTS frame is busy, the user STA may not transmit the CTS frame.

If the sub-channel of the 20 MHz unit corresponding to the channel indicated by the RTS frame is idle and the primary 20 MHz channel is busy, the user STA cannot transmit the CTS frame.

As assumed above in FIG. 13, FIG. 14, and FIG. 16, when all of the first to seventh sub-channels CH1 to CH7 are in an idle state, the first STA 1310 may transmit the CTS frame through the first sub-channel CH1.

The second STA 1320 may transmit the CTS frame through the first and second sub-channels CH1 and CH2. The third STA 1330 may transmit the CTS frame through the first and third sub-channels CH1 and CH3. The fourth STA 1340 may transmit the CTS frame through the first and fourth sub-channels CH1 and CH4.

Although not shown, the MU RTS frame mentioned in the present specification may further include a 1-bit primary channel indicator. For example, if the primary channel indicator is '1', transmission may be performed by necessarily including the primary channel. For example, if the primary channel indicator is '0', the CTS frame may be transmitted only on a channel for receiving data.

As another example, the MU RTS frame mentioned in the present specification may further include a 1-bit primary clear channel assessment (CCA) indicator. For example, if the primary CCA indicator is '1', the CTS frame may be transmitted only when the primary channel is idle. For example, if the primary CCA indicator is '0', the CTS frame may be transmitted regardless of whether a channel state of the primary channel is idle/busy.

Figure 17:
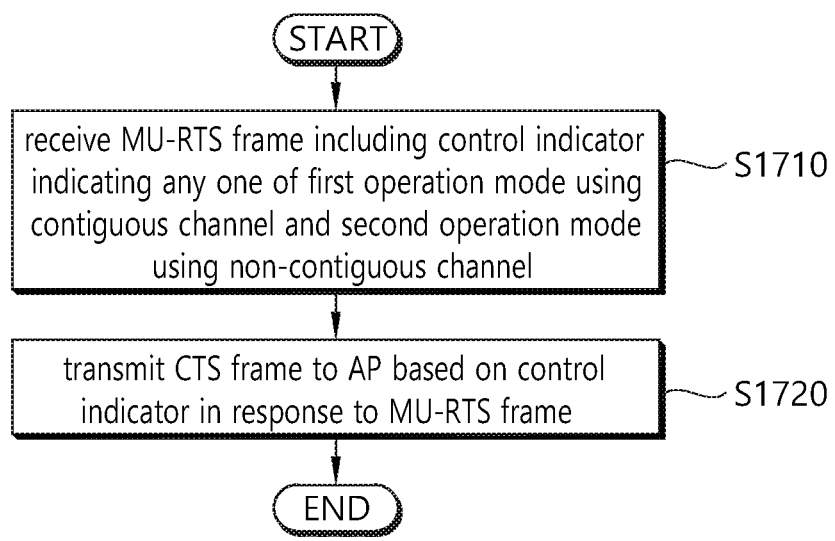
FIG. 17 is a flowchart illustrating a method of transmitting a frame in a WLAN according to the present embodiment.

FIG. 17 is a flowchart illustrating a method of transmitting a frame in a WLAN according to the present embodiment.

In step S1710, a user station (STA) may transmit a multi user-request to send (MU-RTS) frame to protect transmission for multi-users from an access point (AP).

The MU-RTS frame according to the present embodiment may include common information commonly allocated for the multi-users and user-specific information allocated individually to the multi-users.

In addition, the MU-RTS frame according to the present embodiment may include a control indicator indicating any one of a first operation mode using a predetermined first channel and a second channel contiguous to the first channel and a second operation mode using the first channel and a third channel non-contiguous to the first channel.

In step S1720, the user STA may transmit a clear to send (CTS) frame to the AP according to the control indicator in response to the MU-RTS frame.

Figure 18:
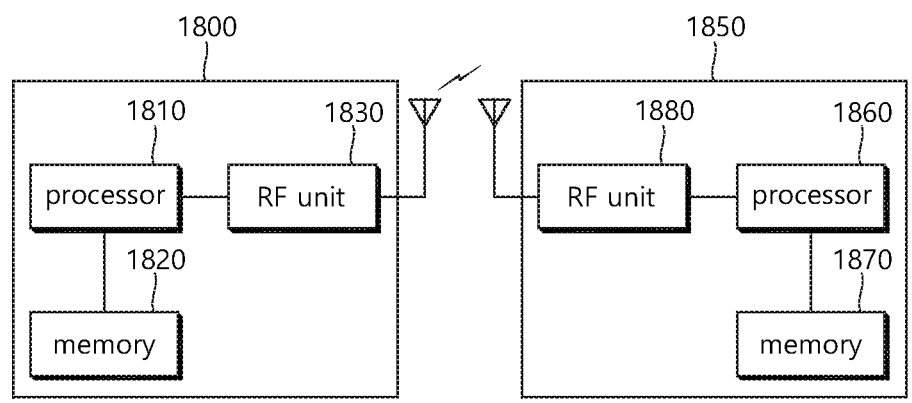
FIG. 18 is a block view illustrating a wireless device to which the exemplary embodiment of the present invention can be applied.

FIG. 18 is a block view illustrating a wireless device to which the exemplary embodiment of the present invention can be applied.

Referring to FIG. 18, as an STA that can implement the above-described exemplary embodiment, the wireless device may correspond to an AP or a non-AP station (STA). The wireless device may correspond to the above-described user or may correspond to a transmitting device transmitting a signal to the user.

The AP 1800 includes a processor 1810, a memory 1820, and a radio frequency (RF) unit 1830.

The RF unit 1830 is connected to the processor 1810, thereby being capable of transmitting and/or receiving radio signals.

The processor 1810 implements the functions, processes, and/or methods proposed in the present invention. For example, the processor 1810 may be implemented to perform the operations according to the above-described exemplary embodiments of the present invention. More specifically, among the operations that are disclosed in the exemplary embodiments of FIG. 1 to FIG. 17, the processor 1810 may perform the operations that may be performed by the AP.

The non-AP STA 1850 includes a processor 1860, a memory 1870, and a radio frequency (RF) unit 1880.

The RF unit 1880 is connected to the processor 1860, thereby being capable of transmitting and/or receiving radio signals.

The processor 1860 implements the functions, processes, and/or methods proposed in the present invention. For example, the processor 1860 may be implemented to perform the operations of the non-AP STA according to the above-described exemplary embodiments of the present invention. The processor may perform the operations of the non-AP STA, which are disclosed in the exemplary embodiments of FIG. 1 to FIG. 17.

The processor 1810 and 1860 may include an application-specific integrated circuit (ASIC), another chip set, a logical circuit, a data processing device, and/or a converter converting a baseband signal and a radio signal to and from one another. The memory 1820 and 1870 may include a read-only memory (ROM), a random access memory (RAM), a flash memory, a memory card, a storage medium, and/or another storage device. The RF unit 1830 and 1880 may include one or more antennas transmitting and/or receiving radio signals.

When the exemplary embodiment is implemented as software, the above-described method may be implemented as a module (process, function, and so on) performing the above-described functions. The module may be stored in the memory 1820 and 1870 and may be executed by the processor 1810 and 1860. The memory 1820 and 1870 may be located inside or outside of the processor 1810 and 1860 and may be connected to the processor 1810 and 1860 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method of transmitting a frame in a wireless local area network (WLAN), the method comprising:

receiving, by a user station (STA), a multi user-request to send (MU-RTS) frame that solicits simultaneous clear-to-send (CTS) responses from one or more STAs from an access point (AP) via a first channel, wherein the MU-RTS frame includes common information commonly allocated to the one or more STAs, user-specific information individually allocated to the one or more STAs, and control information informing whether use of a second channel is allowed for the one or more STA, and wherein the second channel is non-contiguous to the first channel;

determining, by the user STA, whether the first channel and the second channel are in an idle state for a specific interval when the second channel is allocated to the STA based on the MU-RTS frame and the second channel is allowed according to the control information; and transmitting, by the user STA, a CTS frame to the AP via the first channel and the second channel in response to the MU-RTS frame when it is determined that the first channel and the second channel are in the idle state for the specific interval.

2. The method of claim 1, wherein the first channel corresponds to a primary 20 MHz channel, wherein the second channel corresponds to a secondary 40 MHz channel or a secondary 80 MHz channel.

3. The method of claim 1, wherein when the second channel is not allowed by the control information, the CTS frame is transmitted only via the first channel regardless of the second channel.

4. The method of claim 1, wherein the CTS frame is transmitted by being comprised in a non-high throughput physical layer protocol data unit (non-HT PPDU).

5. A wireless terminal using a method of transmitting a frame in a wireless local area network (WLAN), the wireless terminal comprising:

a transceiver for transmitting and receiving a radio signal; and a processor operatively coupled to the transceiver, wherein the processor is configured for:

receiving a multi user-request to send (MU-RTS) frame that solicits simultaneous clear-to-send (CTS) responses from one or more STAs from an access point (AP) via a first channel, wherein the MU-RTS frame includes common information commonly allocated to the one or more STAs, user-specific information individually allocated to the one or more STAs, and control information informing whether use of a second channel is allowed for the one or more STA, and wherein the second channel is non-contiguous to the first channel;

determining whether the first channel and the second channel are in an idle state for a specific interval when the second channel is allocated to the STA based on the MU-RTS frame and the second channel is allowed according to the control information; and transmitting a CTS frame to the AP via the first channel and the second channel in response to the MU-RTS frame when it is determined that the first channel and the second channel are in the idle state for the specific interval.

6. The wireless terminal of claim 5, wherein the first channel corresponds to a primary 20 MHz channel, wherein the second channel corresponds to a secondary 40 MHz channel or a secondary 80 MHz channel.

7. The wireless terminal of claim 5, wherein when the second channel is not allowed by the control information, the CTS frame is transmitted only via the first channel regardless of the second channel.

8. The wireless terminal of claim 5, wherein the CTS frame is transmitted by being comprised in a non-high throughput physical layer protocol data unit (non-HT PPDU).

* * * * *